US012663826B2

(12) United States Patent
Lien et al.

(10) Patent No.: US 12,663,826 B2
(45) Date of Patent: Jun. 23, 2026

(54) VOLTAGE REFERENCE CIRCUIT

(71) Applicant: Taiwan Semiconductor Manufacturing Company, Ltd., Hsinchu (TW)

(72) Inventors: Bei-Shing Lien, Taipei City (TW); Szu-Lin Liu, Hsinchu City (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

(21) Appl. No.: 18/672,398

(22) Filed: May 23, 2024

(65) Prior Publication Data

US 2025/0362701 A1 Nov. 27, 2025

(51) Int. Cl.

*G05F 3/26* (2006.01)
*G05F 1/46* (2006.01)
*G05F 1/567* (2006.01)

(52) U.S. Cl.

CPC .............. *G05F 3/262* (2013.01); *G05F 1/468* (2013.01); *G05F 1/567* (2013.01)

(58) Field of Classification Search

None

See application file for complete search history.

(56) References Cited

U.S. PATENT DOCUMENTS

| | | | | |
|---|---|---|---|---|
| 5,180,967 | A * | 1/1993 | Yamazaki | G05F 3/262 323/315 |
| 6,946,896 | B2 * | 9/2005 | Behzad | G05F 3/262 327/512 |
| 7,119,527 | B2 * | 10/2006 | Fernald | G05F 3/262 327/539 |
| 7,652,520 | B2 * | 1/2010 | Gatta | H10D 84/83 327/581 |
| 8,093,880 | B2 * | 1/2012 | Boas | G05F 3/16 323/312 |
| 10,163,899 | B2 * | 12/2018 | Kundu | H10D 64/017 |
| 10,680,641 | B2 * | 6/2020 | Harada | H03M 7/165 |
| 11,474,552 | B2 * | 10/2022 | Kundu | G05F 3/242 |
| 11,592,857 | B2 | 2/2023 | Shen et al. | |

FOREIGN PATENT DOCUMENTS

| | | | |
|---|---|---|---|
| CN | 113703510 | A | 11/2021 |
| CN | 115437442 | A | 12/2022 |
| JP | 2016-226197 | A | 12/2016 |
| TW | 202201722 | A | 1/2022 |

* cited by examiner

*Primary Examiner* — Thomas J. Hiltunen
(74) *Attorney, Agent, or Firm* — Merchant & Gould P.C.

(57) ABSTRACT

A bandgap voltage reference circuit is provided. In one example, a cell includes a first device including a first plurality of MOSFETs connected in series The cell further includes a second device including a second plurality of MOSFETs connected in series. The second device connects in series with the first device. The second plurality of MOSFETs has a second Vt that is higher than the first Vt. The cell further includes a reference node connected between the first stack gate device and the second stack gate device.

20 Claims, 8 Drawing Sheets

600

| M1 | M2 |
|---|---|
| SVT | LVT/ULVT/ELVT |
| LVT | ULVT/ELVT |
| ULVT | ELVT |

Combination table

FIG. 6

VOLTAGE REFERENCE CIRCUIT

BACKGROUND

Precision bandgap voltage references are electronic circuits designed to produce a stable and predictable voltage output, regardless of variations in temperature, power supply fluctuations, or time. References produce a voltage that has little variation, despite differing environmental factors. As a result, these circuits are ideal for use in analog-to-digital converters (ADCs) and digital-to-analog converters (DACS), measurements in sensors, power regulation, medical devices, and communication devices. The bandgap voltage references provide these types of devices a stable and accurate measurement voltage. For example, a sensor uses a reference for comparing a produced voltage that is responsive to a detected condition. The precise and accurate nature of the reference voltage ensures that the sensor will produce an accurate reading. Bandgap references combine voltages that have positive and negative temperature coefficients (e.g., Proportional to Absolute Temperature (PTAT) and Complementary to Absolute Temperature (CTAT)) to compensate for each other. The output voltage is close to the theoretical bandgap voltage of the semiconductor used. For example, a silicon bandgap is approximately 1.25 volts (V).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 illustrates an example combination table for the stack gate cell of FIG. 3 in accordance with disclosed embodiments.

DETAILED DESCRIPTION

Figure 1:
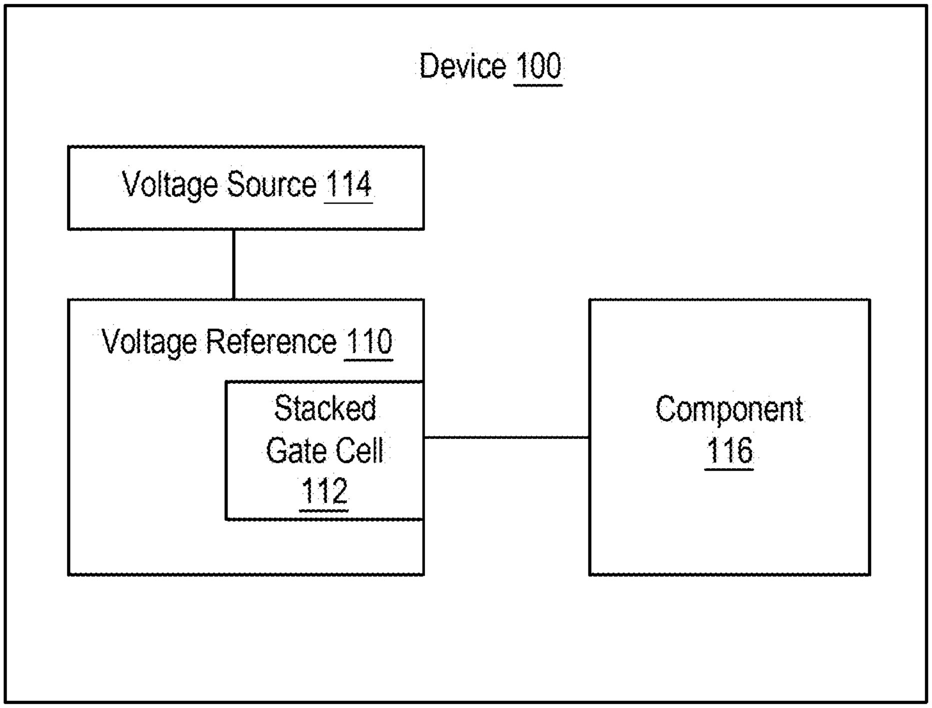
FIG. 1 illustrates an example device that includes a voltage reference in accordance with disclosed embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. The term "cell" used throughout the present disclosure refers to a group of circuit patterns in a design layout to implement specific functionalities of a circuit.

Embodiments of the present disclosure are directed to a bandgap voltage reference with a stacked gate device. Many bandgap references use bipolar junction transistors (BJTs) due to BJTs predictable temperature behavior, low noise, and stable performance. As semiconductor device technology advances, there is less space between contacts. Accordingly, some modern electronic design uses metal oxide semiconductor field effect transistors (MOSFETs) since BJTs tend to require more space. Accordingly, using MOSFETs in a complementary MOS (CMOS) design helps preserve space on a circuit by scaling with other components in the device that also use MOSFETs. These types of MOSFET only voltage references are used in communication devices, data converter devices, and other integrated circuits (ICs), for example. Further, MOSFET only voltage references may use a PTAT/CTAT cell that utilizes different threshold voltages of the transistors to remove the temperature dependence of the voltage. In some embodiments, the stacked gate cell voltage can produce a stable voltage for temperatures between −25°-125°. However, traditional 3 $\sigma$ inaccuracy of these MOSFET only bandgap voltage references is around 15-20%.

The presently described voltage reference with a stacked gate device includes a first stacked gate device with a plurality of MOSFETs that are connected in series and a second stacked gate device with a second plurality of MOSFETS. The second stacked gate device is connected in series with the first stacked gate device, i.e., the transistors of the stacked gate device are connected via a common source/drain terminal. Further, the gate terminals of each transistor are connected to a common node. The reference node that supplies the bandgap voltage reference is connected at a junction of the first stacked gate device and the second stacked gate device. The second plurality of MOSFETs have a higher threshold voltage (Vt) than the first plurality of MOSFETs. These stacked gate devices are used to form either a CTAT or PTAT cell of the voltage reference.

Using this design increases stability within the cell, accordingly, there is less voltage variation. Further, the stacked gate design boosts output resistance. The stacked gate design also results in a boosted output reference voltage due to the increased channel length from using a plurality of MOSFETs. Through this configuration, the voltage reference produces a voltage that is resistant to temperature fluctuations and the output 3 σ inaccuracy is reduced by 33-50%. Voltage regulators, ADCs and DACs, precision measurement systems, temperature sensors, bias generations, and memory can use the described stacked gate device for the mentioned benefits. Further, the stacked gate device design for a voltage reference is compatible with 20 nm (N20), 16 nm (N16), 10 nm (N10), N7, N5, N3, 2 nm (N2), and other technology generations.

FIG. 1 illustrates an example device 100 that includes a voltage reference circuit 110. In the shown embodiment, the device 100 includes a voltage reference circuit 110 with a stacked gate cell 112. A voltage source connects to the voltage reference circuit 110. Component 116 uses the voltage reference circuit 110 for a function.

In the shown embodiment, the voltage reference circuit 110 includes the stacked gate cell 112. The voltage reference circuit 110 is configured to produce a bandgap voltage reference, which may be at 1.25 V. 1.25 V is near the bandgap voltage for silicon, which is widely used in electronics. In some embodiments, the voltage is equal to or between 1.2-1.3V. In other embodiments, the voltage is a different voltage, such as the bandgap voltage for a different material. In addition, the produced voltage is independent of temperature. When the absolute temperature fluctuates, the voltage reference remains at substantially the same level. Further, the voltage is also resistant to variations of supplied power or volage and the electrical load. In some embodiments, the voltage reference circuit 110 produces a voltage that is proportional to temperature, i.e., the voltage rises with absolute temperature, or is complementary to temperature, i.e., the voltage decreases as absolute temperature increases.

The component 116 uses the produced voltage reference for the component's designed task. For example, the component is a memory module that uses the produced voltage for accurate writing operations and read operations. In some embodiments, the component is a temperature sensor. If the voltage reference is designed to increase or decrease with absolute temperature, the temperature sensor detects changes in the voltage reference to calculate a current temperature. Other temperature sensors produce a voltage that varies with temperature, and the compares the temperature sensor produced voltage with the reference voltage from the voltage reference circuit 110 to calculate a temperature. In some embodiments, the component 116 is a measurement system such as a multimeter, oscilloscope, or other lab equipment. The voltage produced from the voltage reference circuit 110 is used to maintain accuracy and prevent drift due to temperature changes. In other embodiments, the component 116 is a ADCs or DACs. The voltage reference circuit 110 produces a stable voltage that is used by either converter to the quantization steps for accurate conversion between analog and digital signals. The stable voltage reference is used by the converters for reliable and consistent conversion across varying operating conditions.

Further, the voltage source 114 is configured for a variety of voltages. For example, the voltage produced from the voltage source 114 may be 1.4V or 1.5V. Low-voltage bandgap references may be configured to receive a sub-1V supply voltage from voltage source 114. Other embodiments, use 1V or 1.2V for a supply voltage. In still other embodiments, the voltage source 114 supplies a different level voltage to the voltage reference circuit 110. In some embodiments, the voltage reference circuit 110 produces a 3σ inaccuracy between four to ten percent.

Figure 2:
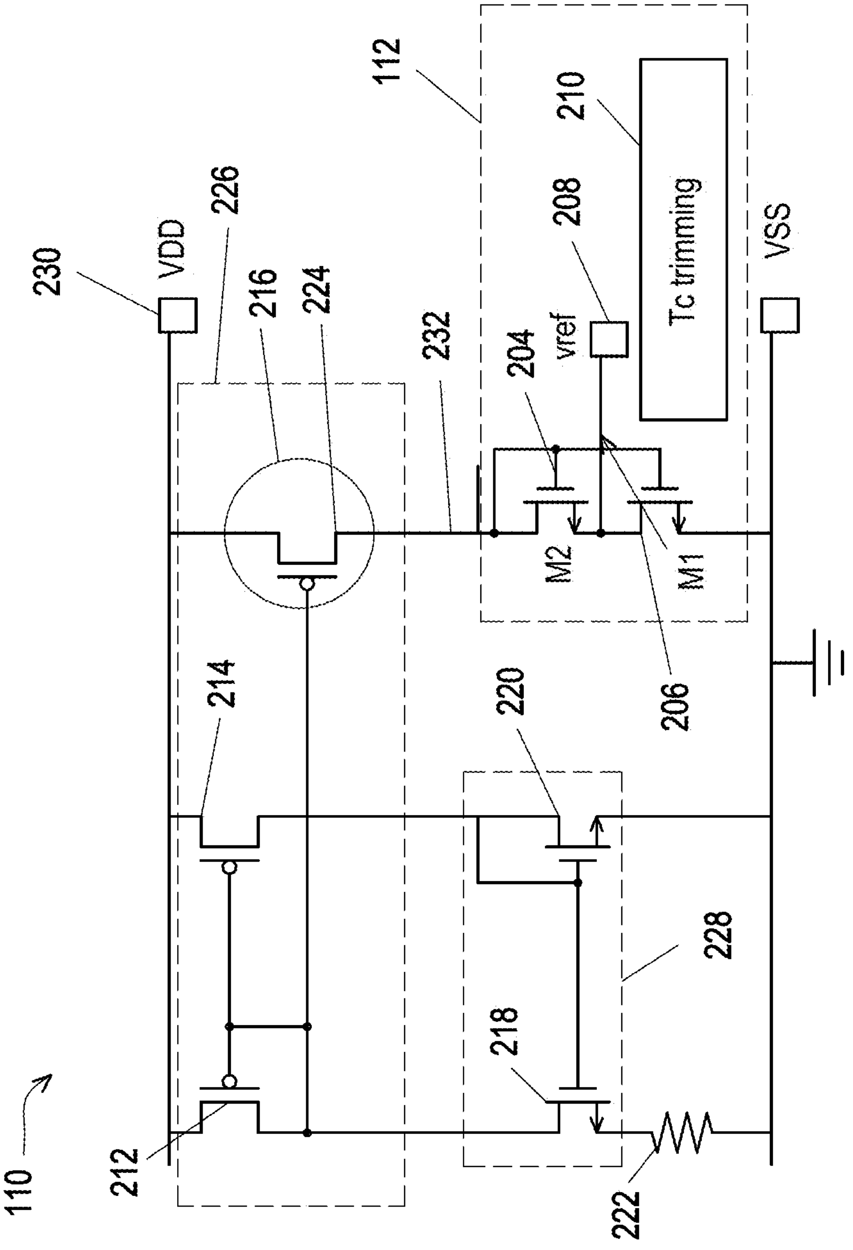
FIG. 2 illustrates an example voltage reference with a stack gate cell of the device in FIG. 1 in accordance with disclosed embodiments.

FIG. 2 illustrates an example voltage reference with a stack gate cell 112 of the device in FIG. 1. The voltage reference circuit 110 is a circuit that includes a stack gate cell 112. The stack gate cell includes a stacked gate device 204 and a stacked gate device 206. A reference node 208 connects at a junction of the stacked gate 204 and the stacked gate device 206. A temperature coefficient (TC) trimming circuit is also included with the stacked gate device 206. A current source 216 connects to the stack gate cell 112. The current source is produced by a MOSFET 224 that is part of a current mirror 226. The current mirror 226 also includes a MOSFET 212 and a MOSFET 214. In addition, the voltage reference circuit 110 includes a second current mirror 228, which includes a transistor 218 and a transistor 220. A resistor 222 connects to the transistor 218 to bias the second current mirror 228, which also affects the biasing of the first current mirror 226. Further, the voltage terminal 230 connects to the voltage source 114.

Here, the voltage reference circuit 110 includes the stacked gate cell 112 for outputting a stable voltage signal to reference node 208. Further, the stacked gate device 204 and the stacked gate device 206 operate together to produce the stable voltage at reference node 208. The stacked gate device 204 and stacked gate device 206 each include a plurality of MOSFETs. Further, a first plurality of MOSFETs of the stacked gate device 204 includes a first Vt. The stacked gate device 206 includes a second plurality of MOSFETs with a second Vt that is higher than the first Vt. The stacked gate device 206 having a second plurality of MOSFETs with a higher Vt than the first plurality of MOSFETs enables the stacked gate cell to maintain a stable voltage at the reference node 208. The voltage at the reference node is calculated by $Vref=Vgs\_high*Vt2-Vgs\_low*Vt1\sim Vt2-Vt1$, where Vgs_high is the Vgs of the second plurality of MOSFETs of the second stacked gate device, Vt2 is the threshold voltage of each MOSFET of the second plurality of MOSFETs of the second stacked gate device, Vgs_low is the Vgs of each MOSFET of the first plurality of MOSFETs of the first stacked gate device, and Vt1 is the threshold voltage of each MOSFET of the first plurality of MOSFETs of the first stacked gate device.

In addition, including the stacked gate design for stacked gate device 204 and the stacked gate device 206 boosts output resistance, resulting in less output voltage variation. In some embodiments, the MOSFETs of the first plurality of MOSFETs and the second plurality of MOSFETs are classified according to the table shown in association with FIG. 6. In some embodiments, the stacked gate cell 112 is a CTAT cell that produces a voltage that decreases as temperature increases. This effect is balanced by a corresponding PTAT cell formed by the current mirror 226 and the current mirror 228.

The stacked gate cell 112 also includes a TC trimming circuit 210. The TC trimming circuit connects to the stacked gate device 206 to alter the temperature dependence of the stacked gate cell 112. Further, the TC trimming circuit 210 adjusts the temperature coefficient of the reference voltage from the cell 112 by adjusting the number of active parallel devices to the stacked gate device 206. In some embodiments, the parallel devices are the same or similar as the stacked gate device 206. In some embodiments, the stacked gate cell 112 omits the TC trimming circuit and directly connects Vg in parallel to each MOSFET of the stacked gate device 206. In some embodiments, the TC trimming circuit 210 adjusts the temperature dependence of the reference voltage at the reference node 208. For example, the trimming circuit 210 may form a PTAT cell to balance a CTAT cell.

The stacked gate cell 112 connects to the current source 216. The current source 216 includes the MOSFET 224. The MOSFET 224 operates as part of the current mirror 226 to produce the desired current. The current of the current source 216 is driven by the MOSFETs 212 and 214, which form additional parts of the current mirror 226. In the shown embodiment, the MOSFETs 212, 214, and 224 are MOSFETs, and in particular, they are PMOS. However, other embodiments may use NMOS or BJTs to form the current mirror 226 and the current source 216.

The current mirror 226 also connects to the current mirror 228. The current mirror 228 further drives the current produced by the current source 216. For example, the resistor 222 can be altered to change the magnitude of the produced current of the current source 216. In some embodiments, the current mirror 226, current mirror 228, and resistor 222 operate to produce a voltage that increases as temperature increases. In some embodiments, these components form a PTAT cell. Accordingly, combining the proportional to temperature nature of the produced voltage from the PTAT cell with the inverse relationship from a CTAT cell results in a voltage that is relatively independent of absolute temperature. In some embodiments, the stacked gate cell 112 is a CTAT cell. In some embodiments, the MOSFETs 212, 214, 224, 218, and 220 are other transistors such as a BJT, JFET, or other types of transistors.

Figure 3:
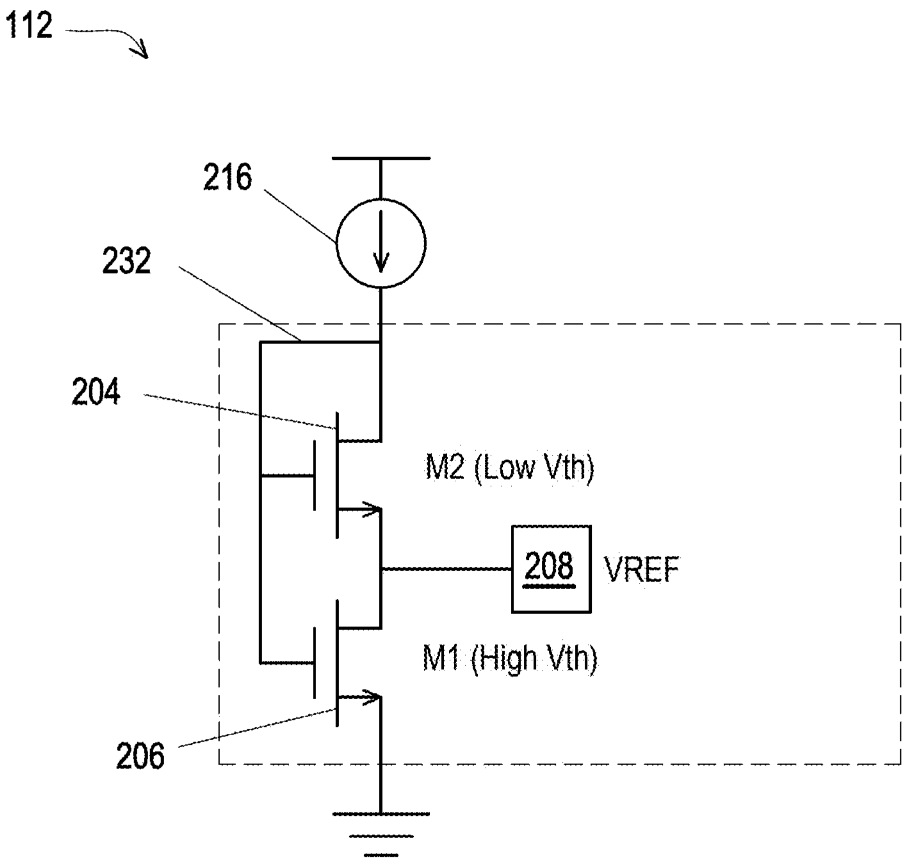
FIG. 3 illustrates an example stack gate cell of FIG. 2 in accordance with disclosed embodiments.

FIG. 3 illustrates an example stack gate cell 112 of FIG. 2. In the shown embodiment, the current source 216 connects to the drain of the stacked gate device 204 and the gate of both the stacked gate devices 204 and 206.

In the shown embodiment, the stacked gate device 204 includes a first plurality of MOSFETs connected in series with each gate of the first plurality of MOSFETs connected to a first node 232. The first node 232 is connected to the current source 216. Source/drain terminals of one of the first plurality of MOSFETs of the first stacked gate device 204 is connected to the first node 232, the first plurality of MOSFETs have a first threshold Vt. As used herein, source/drain terminals may refer to a source or a drain, individually or collectively dependent upon the context. In some embodiments, the first node 232 connects to a different device, such as the voltage source 114. The second stacked gate device 206 includes a second plurality of MOSFETs connected in series. The second stacked gate device 206 connects in series with the first stacked gate device 204. The second plurality of MOSFETs has a second Vt that is higher than the first Vt. Further, the source/drain terminal of a MOSFET of the second plurality of MOSFETs connects to a source/drain terminal of a MOSFET of the first plurality of MOSFETs. The reference node 208 connects to the node where the first plurality of MOSFETs connect to the second plurality of MOSFETs. Accordingly, the reference node connects at a junction of the first stack gate device 204 and the second stack gate device 206.

Figure 4:
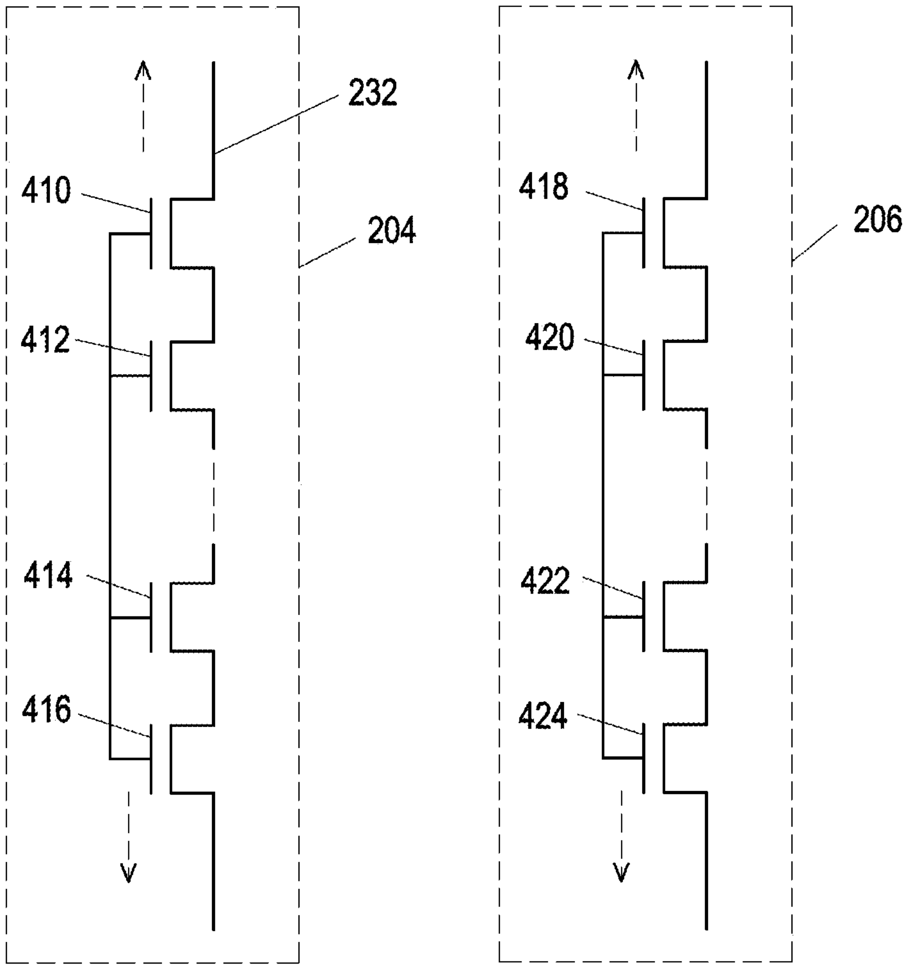
FIG. 4 illustrates example stack gate devices of FIG. 3 in accordance with disclosed embodiments.

FIG. 4 illustrates example stacked gate devices 204 and 206 of FIG. 3. In the shown embodiment, the stack gate device 204 and the stacked gate device 206 include four MOSFET transistors. The stack gate device 204 includes MOSFET 410, MOSFET 412, MOSFET 414, and MOSFET 416 with their gates connected to the same node, resulting in a common gate. Likewise, the stacked gate device 206 includes MOSFET 418, MOSFET 420, MOSFET 422, and MOSFET 424. In addition, a source/drain terminal of the MOSFET 410 connects to a first node 232.

In some embodiments, the second stacked gate device 206 includes more MOSFETs than the first stacked gate device 204. In the shown embodiment, the stacked gate design includes multiple individual transistors in series. Each source/drain terminal connects to source/drain terminals of adjacent transistors. In some embodiments, these connections results in the MOSFETs being in a cascode configuration. Including numerous cascading stages results in a boosted output resistance. The stacked gate device 204 includes MOSFETs 410, 412, 414, and 416. The MOSFET 410 operates in the saturation region. In the saturation region, the drain current operates relatively independently of the drain-source voltage. The MOSFETs 412, 414, and 416 operate in the linear region during use. In the linear region, the drain current is proportional to the drain-source voltage. The same or similar principles apply to the stacked gate device 206 as well. In some embodiments, the first node 232 connects to the current source 216. In other embodiments, the first node 232 connects to a voltage terminal, such as voltage source 114.

In some embodiments, the stacked gate design is implemented through segmenting a gate of a large transistor into "fingers." In a multi-finger transistor, the wide gate of a single transistor is split into multiple sections called "fingers." These fingers all share the same source and drain regions, but each finger has its own gate connected in parallel to the others. For example, a transistor with a long substrate may have a gate separated into parallel fingers. The area between each finger becomes a corresponding source/drain, resulting in a plurality of MOSFETs in series. Moreover, more or less than the shown number of transistors may form either of the stacked gate devices 204 and 206. For example, either stacked gate device may include 10-40 transistors. In some embodiments, the number of transistors for either stacked gate device 33 transistors. In some embodiments, the number of transistors is 100. Further, the stacked gate device 204 may include a different number of transistors than the stacked gate device 206.

In the shown embodiment, the transistors for both stacked gate devices are NMOS. In other embodiments, one or more of the transistors of the stacked gate devices are PMOS. In some embodiments, each MOSFET 410-416 is the same type of transistor and includes the same Vt. For example, the MOSFETs 410-416 are the same classification in the combination table 600 discussed in association with FIG. 6.

Figure 5A:
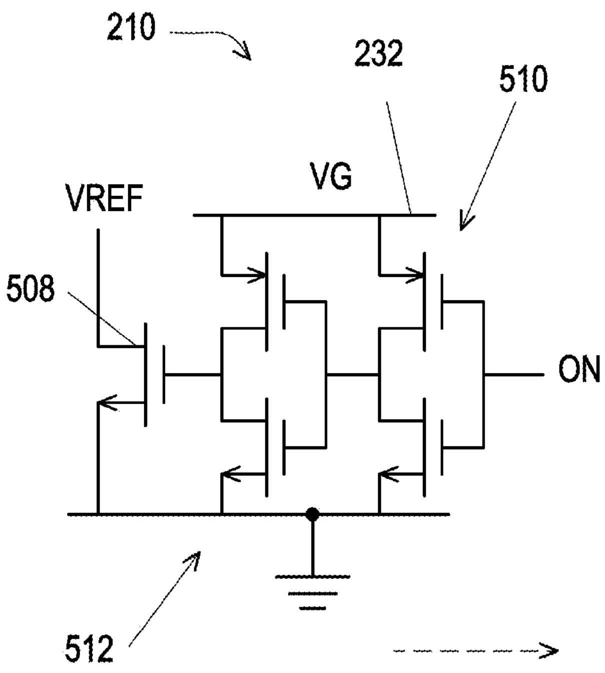
FIG. 5A illustrates an example trimming circuit of the stack gate cell of FIG. 2 in accordance with disclosed embodiments.
Figure 5B:
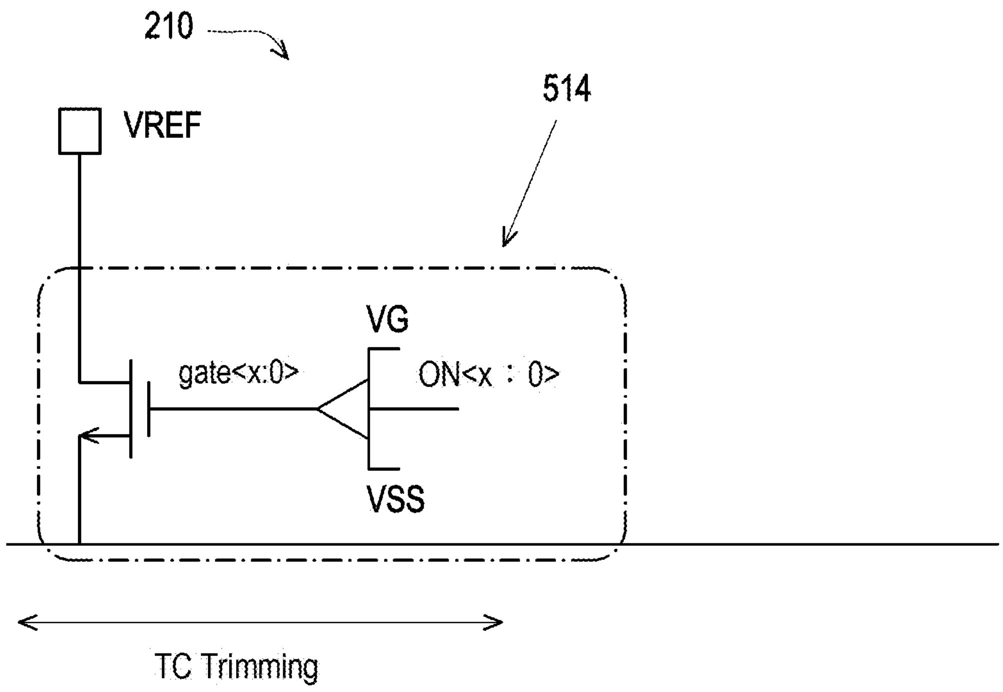
FIG. 5B illustrates an additional example embodiment of the trimming circuit of FIG. 2 in accordance with disclosed embodiments.

FIG. 5A illustrates an example trimming circuit 210 of the stack gate cell 112 of FIG. 2. Here, the TC trimming circuit 210 includes an inverter 510 and an inverter 512 that connect to the gate of the device 508. FIG. 5B illustrates another example of the trimming circuit 210, but with a schematic 514 of the trimming circuit 210 to show the bit inputs for testing different bit input sequences. These input sequences affect the temperature coefficient voltage level at the reference node 208.

In some embodiments, the trimming circuit adjusts a temperature coefficient of the output voltage from the cell 112. In some embodiments, the trimming circuit includes two or more inverters, such as inverter 510 and inverter 512. In some embodiments, the two or more inverters 510 and 512 connect to a gate of a MOSFET, such as device 508, that is connected in parallel with the second stacked gate device 206. The two or more inverters 510 and 512 also connect to the first node 232. The first node 232 connects to Vg and the current source 216. In additional embodiments, the TC trimming circuit 210 produces a stable voltage that is independent of temperature. The TC trimming circuit 210 performs both the CTAT and PTAT functions to balance the voltage dependence on temperature so that the CTAT and PTAT functions cancel out.

In the shown embodiment, the trimming circuit 210 connects to the stacked gate device 506 between the gate terminal of each transistor and the voltage Vg. In the shown embodiment, the inverter 510 and the inverter 512 connect to the gate of the MOSFET 508. An ON bit is input to the inverter 510, that outputs an inverted bit to the inverter 512. The inverter 512 inputs a corresponding ON signal to the MOSFET 508 that causes the MOSFET 508 to activate. In some embodiments, the gate is a finger connected to an extended substrate, thus, enabling the MOSFET 418 to turn on or form. Extending the shown selection circuit to each transistor of the stacked gate device 206 enables TC trimming. In some embodiments, the TC trimming circuit adds inverters connected to each transistor's gate or omits an inverter. Varying the number of inverters connected to each gate of the MOSFETs 418-424 controls which transistors turn on based on the number of trimming bits, thus, enabling a varying temperature coefficient of the voltage from the cell 112. In some embodiments, additional parallel devices similar to the MOSFET 508 include connected inverters similar to the two inverters 510 and 512.

Here, the device 508 is a parallel transistor to the stacked gate device 206. In some embodiments, the device 508 is a stacked gate device and is the same design as the stacked gate device 206. Further, additional devices are connected in parallel to the device 508 and are the same as the device 508. In one embodiment, the parallel devices of the trimming circuit 210 are connected in parallel. The fingers connect to Vg through a digital circuit that includes inverter 510 and 512. The TC trimming circuit digitally selects which device to activate. This selection determines the number of devices, such as the device 508, that are connected in parallel to the stacked gate device 206. These devices may have varying features which allows for adjusting the temperature coefficient of the cell 112.

In some embodiments, the devices connected in parallel, such as the device 508, have different finger numbers. For example, a first device may be a single finger device. The device 508 is connected in parallel to the first device and has a finger number of two. The resulting circuit will be the shown double inverter circuit of inverter 510 and inverter 512 connected to the gate of the parallel device. In additional embodiments, a third device is connected in parallel. The third device has a finger number of four. In some embodiments, the number of fingers for the selected parallel device corresponds to a trimming bit. For example, bits 0, 1, 2, 3, and 4 correspond to finger numbers 1, 2, 4, 8, and 16. These input bits are used by a controller. The controller inputs the selected bits as seen in schematic 514. For example, if the number of trimming bits is 5, then x will equal 4 and select the corresponding device using the shown trimming circuits. Thus, adjusting the number of fingers for a selected parallel device, such as device 508 results in adjusting the temperature coefficient since the finger sizes are adjusted.

For example, one embodiment includes 5 parallel devices that are similar to the device 508. However, each device includes a different number of fingers that vary in size. Selection bits 0, 1, 2, 3, and 4 control which parallel devices are turned on. With a varying number of fingers and finger sizes, the TC trimming circuit 210 is able to accommodate a wide range of temperatures and still result in the voltage reference circuit 110 outputting a stable voltage. In an embodiment that includes each parallel device being the same as the stacked gate device 206, the TC trimming circuit 210 trims the temperature coefficient by adjusting the finger size of the stacked gate device 206 since the number of fingers and finger size will vary depending on the selected parallel device. In some embodiments, the optimal parallel device or devices to activate for TC trimming is determined through testing and observing the voltage variation as a function of temperature. Once determined, the correct bit sequence is input into the TC trimming circuit 210 to activate the selected devices.

In some embodiments, selecting a parallel device, such as device 508 with a different finger number increases the number of MOSFETs connected in series. Accordingly, a different number of MOSFETs of a stacked gate device 206 can be selected by choosing a parallel device with a different number of fingers. Additional embodiments include adjusting the size of the fingers rather than the number by selecting a parallel device that includes MOSFETs with different finger sizes. Size adjustment also trims the temperature coefficient.

In some embodiments, the MOSFET 508 connects to the reference node 208 and to a node between one of the MOSFETs of the stacked gate device 206. For example, the MOSFET 508 connects to the reference node 208 with a source/drain node, then connects to the node between the MOSFET 422 and the MOSFET 424. The MOSFET reduces the output resistance of the stacked gate device 206 through turning on MOSFET 508 since it adds a parallel connection to the junction of the MOSFET 422 and the MOSFET 424. In some embodiments, more MOSFETs similar to MOSFET 508 are included and connect to different junctions of the MOSFETs of the stacked gate device 206. In some embodiments, each junction of the MOSFETs of the stacked gate device 206 includes a connected MOSFET connected as described. The schematic 514 indicates the input bits for indicating the number of MOSFETs to turn on. In one example, the stacked gate device 206 includes 100 MOSFETs connected in series. Accordingly, the schematic 514 indicates a number of bits that can be received as input. For example, the input may be indicated as gate <100:0> and ON <100:0>.

FIG. 6 illustrates an example combination table for the stack gate cell of FIG. 3. In the shown embodiment, the combination table 600 includes combinations for M1 MOSFETs and M2 MOSFETs to develop the illustrated stacked gate cell 112. In the shown embodiment, M1 represents the stacked gate device 206 and M2 represents the stacked gate device 204. Based on the combination table 600, if the MOSFETs of the stacked gate device 206 are standard threshold voltage (SVT) transistors, then the MOSFETs of the stacked gate device 204 are one of low threshold voltage (LVT), ultra-low threshold voltage (ULVT), or extremely low threshold voltage transistors. In other embodiments, combinations of other ratings of MOSFETs are used. For example, the stacked gate device 206 is a LVT transistor and the stacked gate device 204 is a ULVT transistor.

Figure 7:
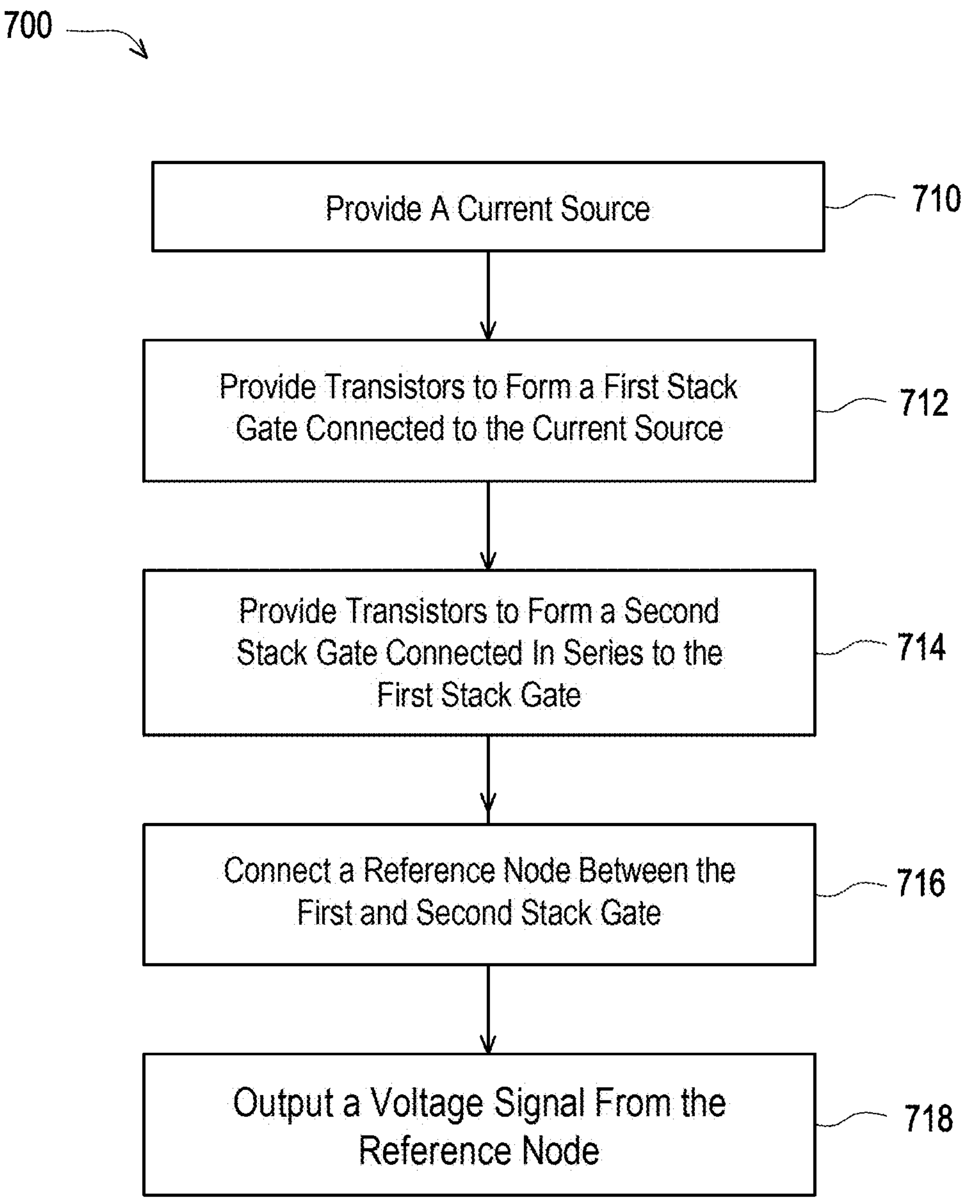
FIG. 7 illustrates an example method for outputting a reference voltage in accordance with disclosed embodiments.

FIG. 7 illustrates an example method for outputting a reference voltage. In the shown embodiment, method 700 includes operations 710-718 for providing a reference voltage that is stable and less sensitive to temperature.

At operation 710, a current source is provided. In some embodiments, the provided current source is current source 216. Further, the current source 216 includes the MOSFET 224 and is part of a current mirror 226. Proceeding to operation 712, a first plurality of MOSFETs connected in series to form a first device are provided. A source/drain terminal of one of the first plurality of MOSFETs of the first device is connected to the current source. The first plurality of MOSFETs includes gates connected to the current source. The first plurality of MOSFETs has a first Vt. In some embodiments, the first plurality of MOSFETs is MOSFETs 410-416. Further, the first device is the first stacked gate device 204.

At operation 714, a second plurality of MOSFETs connected in series is provided to form a second device. The second device is connected in series with the first stack gate device. The second plurality of MOSFETs have a second Vt that is higher than the first Vt. In some embodiments, the second plurality of MOSFETs are MOSFETs 418-424 and the second device is the second stacked gate device 206. In some embodiments, the gates of the second plurality of MOSFETs are connected to an inverter. In other embodiments, the gates of the second plurality of MOSFETs are connected to the current source. In some embodiments, the first plurality of MOSFETs are SVT transistors and the second plurality of MOSFETs are LVT, ULVT, or ELVT.

At operation 716, a reference node is connected at a junction of the first stack gate device and the second stack gate device. In some embodiments, the reference node is reference node 208. Proceeding to operation 718, a voltage signal with decreased voltage variation is output at the reference node. In some embodiments, the method 700 further includes adjusting the temperature coefficient of the second plurality of MOSFETs using a trimming circuit including two or more inverters. The trimming circuit is the trimming circuit 210 and the two or more inverters include the inverter 510 and the inverter 512. In some embodiments, the method 700 includes connecting a MOSFET of the trimming circuit in parallel with the second device and connecting the two inverters to the gate of the MOSFET.

Figure 8:
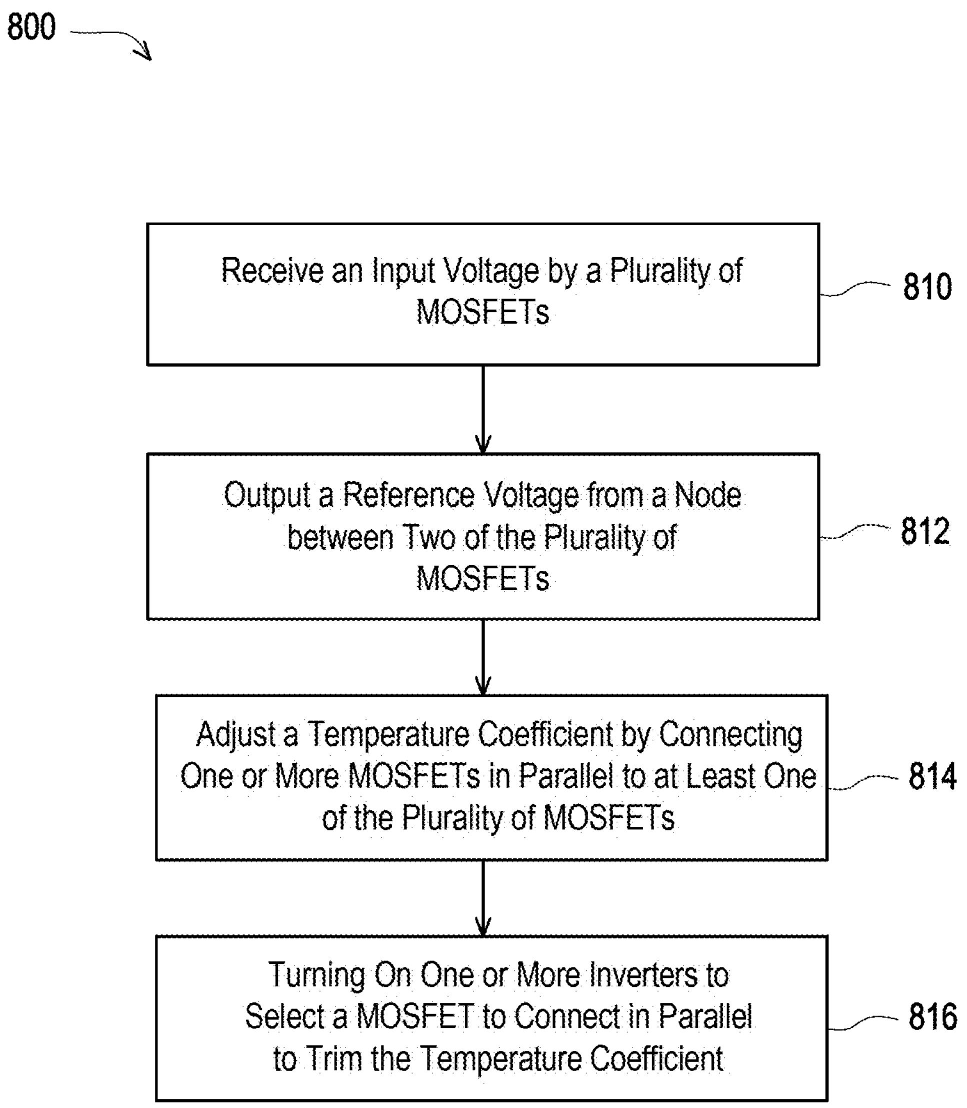
FIG. 8 illustrates an example method for trimming a temperature coefficient of a reference voltage in accordance with disclosed embodiments.

FIG. 8 illustrates an example method for trimming a temperature coefficient of a reference voltage in accordance with disclosed embodiments. In the shown embodiment, method 800 provides operations 810-816 for adjusting a temperature coefficient of a reference voltage.

At operation 810, a first plurality of MOSFETs with a common gate receive an input voltage. The first plurality of MOSFETs is connected in series with a second plurality of MOSFETs. In some embodiments, the first plurality of MOSFETs are MOSFETs 410-416 and the second plurality of MOSFETs are MOSFETs 418-424. In some embodiments, the input voltage is received from the first node 426 connected to the current source 216.

At operation 812, a reference voltage is output at a junction between the first plurality of MOSFETs and the second plurality of MOSFETs. In some embodiments, the reference voltage is output from the reference node 208.

At operation 814, a temperature coefficient of the reference voltage is adjusted. The temperature coefficient is adjusted by connecting one or more MOSFETs in parallel with the second plurality of MOSFETs. In some embodiments, the one or more MOSFETs are the MOSFET 508.

In some embodiments, the method 800 includes operation 816. At operation 816, a MOSFET of the one or more MOSFETs is selected by turning on one or more inverters connected to the at least one MOSFET. In some embodiments, the one or more inverters are inverters 510 and 512.

According to some examples, a cell includes a first plurality of MOSFETs connected in series with each gate of the first plurality of MOSFETs connected to a first node. A source/drain terminal of one of the first plurality of MOSFETs is connected to the first node. Each of the MOSFETs of the first plurality of MOSFETs have a first threshold voltage (Vt). The cell further includes a second plurality of MOSFETs connected in series. The second plurality of MOSFETs are connected in series with the first plurality of MOSFET. Each of the MOSFETs of the second plurality of MOSFETs have a second Vt that is higher than the first Vt. The cell further includes a reference node connected at a junction of the first plurality of MOSFETs and the second plurality of MOSFETs.

According to other examples, a circuit includes a voltage terminal, a first current mirror including three MOSFETs, a second current mirror connected to a first MOSFET and a second MOSFET of the first current mirror. The circuit further includes a cell including a first plurality of MOSFETs connected in series with each gate of the first plurality of MOSFETs connected to a third transistor of the first current mirror. A source/drain terminal of one of the first plurality of MOSFETs is connected to the third MOSFET of the first current mirror. Each of the MOSFETS of the first plurality of MOSFETs have a first threshold voltage (Vt). The cell further includes a second plurality of MOSFETs connected in series with the first plurality of MOSFETs. Each of the MOSFETs of the second plurality of MOSFETs have a second Vt that is higher than the first Vt. The cell further includes a reference node connected at a junction of the first plurality of MOSFETs and the second plurality of MOSFETs.

According to further examples, a method includes receiving an input voltage by a first plurality of MOSFETs with a common gate. The first plurality of MOSFETs are connected in series with a second plurality of MOSFETs. The method further includes outputting a reference voltage at a junction between the first plurality of MOSFETs and the second plurality of MOSFETs, and adjusting a temperature coefficient of the reference voltage by connecting one or more MOSFETs in parallel with the second plurality of MOSFETs.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cell, comprising:

a first plurality of MOSFETs connected in series with each gate of the first plurality of MOSFETs connected to a first node, wherein a source/drain terminal of one of the first plurality of MOSFETs is connected to the first node, each of the MOSFETs of the first plurality of MOSFETs having a first threshold voltage (Vt);

a second plurality of MOSFETs connected in series, the second plurality of MOSFETs connected in series with the first plurality of MOSFETs, each of the MOSFETs of the second plurality of MOSFETs having a second Vt that is higher than the first Vt;

a reference node connected at a junction of the first plurality of MOSFETs and the second plurality of MOSFETs, the reference node being separate from the first node; and a trimming circuit configured to adjust a temperature coefficient of a reference voltage at the reference node, the trimming circuit including two or more inverters, the two or more inverters including a source/drain terminal connected to the first node, and at least one of the inverters connected to the gates of the second plurality of MOSFETs.

2. The cell of claim 1, wherein the second plurality of MOSFETS are standard threshold voltage transistors (SVT) and the first plurality of MOSFETs are one of low threshold voltage transistors (LVT), ultra-low threshold voltage transistors (ULVT), or extremely low threshold voltage transistors (ELVT).

3. The cell of claim 1, wherein the second plurality of MOSFETs are LVT transistors and the first plurality of MOSFETs are ULVT transistors or ELVT transistors.

4. The cell of claim 1, wherein the second plurality of MOSFETs are ULVT transistors and the first plurality of MOSFETs are ELVT transistors.

5. The cell of claim 1, wherein the trimming circuit further includes a MOSFET connected in parallel with the second plurality of MOSFETs, and wherein the two or more inverters connect to a gate of the MOSFET, and wherein the two or more inverters connect to the first node.

6. The cell of claim 1, wherein the second plurality of MOSFETs includes more MOSFETs than the first plurality of MOSFETs.

7. The cell of claim 1, further comprising:

an additional two or more inverters connected to the gates of one or more MOSFETS connected in parallel with the second plurality of MOSFETS.

8. The cell of claim 7, wherein the one or more MOSFETS vary the temperature coefficient of the cell.

9. A circuit, comprising:

a voltage terminal;

a first current mirror including three MOSFETs;

a second current mirror connected to a first MOSFET and a second MOSFET of the first current mirror;

a cell including:

a first plurality of MOSFETs connected in series with each gate of the first plurality of MOSFETs connected to a third transistor of the first current mirror forming a first node, wherein a source/drain terminal of one of the first plurality of MOSFETs is connected to the third MOSFET of the first current mirror, each of the MOSFETs of the first plurality of MOSFETs having a first threshold voltage (Vt);

a second plurality of MOSFETs connected in series, the second plurality of MOSFETs connected in series with the first plurality of MOSFETs, each of the MOSFETs of the second plurality of MOSFETs having a second Vt that is higher than the first Vt; and a reference node connected at a junction of the first plurality of MOSFETs and the second plurality of MOSFETs, the reference node being separate from the first node; and a trimming circuit configured to adjust a temperature coefficient of a reference voltage at the reference node, the trimming circuit including two or more inverters, the two or more inverters including a source/drain terminal connected to the first node, and at least one of the inverters connected to the gates of the second plurality of MOSFETs.

10. The circuit of claim 9, wherein the first plurality of MOSFETs and the second plurality of MOSFETS include ten or more MOSFETs.

11. The circuit of claim 10, wherein the second plurality of MOSFETS are standard threshold voltage transistors (SVT) and the first plurality of MOSFETs are one of low threshold voltage transistors (LVT), ultra-low threshold voltage transistors (ULVT), or extremely low threshold voltage transistors (ELVT).

12. The circuit of claim 10, wherein the second plurality of MOSFETs are LVT transistors and the first plurality of MOSFETs are ULVT transistors or ELVT transistors.

13. The circuit of claim 10, wherein the second plurality of MOSFETs are ULVT transistors and the first plurality of MOSFETs are ELVT transistors.

14. The circuit of claim 10, wherein the first current mirror and second current mirror form a proportional to absolute temperature (PTAT) cell.

15. The circuit of claim 9, wherein the trimming circuit further includes a MOSFET connected in parallel with the second plurality of MOSFETs, and wherein the two or more inverters connect to a gate of the MOSFET, and wherein the two or more inverters connect to the first node.

16. The circuit of claim 9, wherein the second plurality of MOSFETs includes more MOSFETs than the first plurality of MOSFETs.

17. The circuit of claim 9, wherein the cell further comprises:

an additional two or more inverters connected to the gates of one or more MOSFETS connected in parallel with the second plurality of MOSFETS.

18. The circuit of claim 17, wherein the one or more MOSFETS vary the temperature coefficient of the cell.

19. A method, comprising:

receiving an input voltage by a first plurality of MOSFETs with a common gate forming a first node, the first plurality of MOSFETs connected in series with a second plurality of MOSFETs, each of the MOSFETs of the first plurality of MOSFETs having a first threshold voltage (Vt);

outputting a reference voltage at a junction between the first plurality of MOSFETs and the second plurality of MOSFETs, each of the MOSFETs of the second plurality of MOSFETs having a second Vt that is higher than the first Vt, wherein the junction forms a reference node that is separate from the first node; and adjusting a temperature coefficient of the reference voltage by connecting one or more MOSFETs in parallel with the second plurality of MOSFETs, wherein adjusting the temperature coefficient includes providing an on signal to at least one of two or more inverters including a source/drain terminal connected to the first node, and wherein at least one of the inverters is connected to the gates of the second plurality of MOSFETs.

20. The method of claim 19, wherein providing the on signal trims the temperature coefficient based on a number of trimming bits.

* * * * *